(12) United States Patent
Saitou

(10) Patent No.: US 11,644,813 B2
(45) Date of Patent: *May 9, 2023

(54) NUMERICAL CONTROLLER, CNC MACHINE TOOL, NUMERICAL CONTROL METHOD, AND COMPUTER-READABLE INFORMATION STORAGE MEDIUM

(71) Applicant: FANUC CORPORATION, Yamanashi (JP)

(72) Inventor: Kiwamu Saitou, Yamanashi (JP)

(73) Assignee: FANUC CORPORATION, Yamanashi (JP)

(*) Notice: Subject to any disclaimer, the term of this patent is extended or adjusted under 35 U.S.C. 154(b) by 0 days.

This patent is subject to a terminal disclaimer.

(21) Appl. No.: 16/155,381

(22) Filed: Oct. 9, 2018

(65) Prior Publication Data
US 2019/0129382 A1    May 2, 2019

(30) Foreign Application Priority Data
Oct. 30, 2017    (JP) .............................. JP2017-209752

(51) Int. Cl.
G05B 19/4097    (2006.01)
G05B 19/4093    (2006.01)
G05B 19/4103    (2006.01)

(52) U.S. Cl.
CPC ..... G05B 19/4097 (2013.01); G05B 19/4093 (2013.01); G05B 19/40938 (2013.01);
(Continued)

(58) Field of Classification Search
CPC ............ G05B 19/4097; G05B 19/4093; G05B 19/4103; G05B 19/40938; G05B 2219/35528; G05B 2219/34088
See application file for complete search history.

(56) References Cited

U.S. PATENT DOCUMENTS

| | | | | |
|---|---|---|---|---|
| 5,532,932 A | * | 7/1996 | Niwa | ............... G05B 19/401 700/188 |
| 7,016,763 B2 | * | 3/2006 | Fauser | ............ G05B 19/416 700/186 |

(Continued)

FOREIGN PATENT DOCUMENTS

| | | |
|---|---|---|
| CN | 101796463 | 8/2010 |
| CN | 103235556 | 8/2013 |

(Continued)

OTHER PUBLICATIONS

Notification of Reasons for Refusal dated Sep. 24, 2019 in Japanese Patent Application No. 2017-209752.

(Continued)

*Primary Examiner* — Kenneth M Lo
*Assistant Examiner* — Tameem D Siddiquee
(74) *Attorney, Agent, or Firm* — Wenderoth, Lind & Ponack, L.L.P.

(57) ABSTRACT

A numerical controller controls a motor for driving at least one axis based on a machining program including information about a characteristic shape. The numerical controller includes: a characteristic shape reading unit configured to read information about a characteristic shape to be machined from a machining program including information about a characteristic shape; a section setting unit configured to set one or more set sections on a tool path is response to the information about the characteristic shape; and a motion parameter change unit configured to change at least one parameter to be used for controlling the at least ore axis outside the set section and inside the set section.

6 Claims, 9 Drawing Sheets

(52) U.S. Cl.
CPC ............... *G05B 19/4103* (2013.01); *G05B 2219/34088* (2013.01); *G05B 2219/35528* (2013.01)

(56) References Cited

U.S. PATENT DOCUMENTS

| | | | |
|---|---|---|---|
| 8,406,913 B2* | 3/2013 | Fujishima | G05B 19/4155 700/173 |
| 2001/0018312 A1* | 8/2001 | Gottschalk | G05B 19/4099 451/5 |
| 2003/0045964 A1 | 3/2003 | Lottgen et al. | |
| 2003/0125828 A1* | 7/2003 | Corey | G05B 19/409 700/186 |
| 2004/0019394 A1 | 1/2004 | Red et al. | |
| 2005/0246052 A1 | 11/2005 | Coleman et al. | |
| 2007/0085850 A1* | 4/2007 | Hong | G05B 19/41 345/442 |
| 2007/0191982 A1 | 8/2007 | Sullivan | |
| 2012/0011912 A1* | 1/2012 | Flegel | F16L 15/06 72/118 |
| 2015/0324492 A1 | 11/2015 | Iorio et al. | |
| 2017/0227947 A1* | 8/2017 | Ndip-Agbor | G05B 19/29 |
| 2017/0231771 A1 | 8/2017 | Piron et al. | |
| 2017/0308057 A1* | 10/2017 | Kreidler | G05B 19/4069 |
| 2018/0150060 A1* | 5/2018 | Hsu | G05B 19/40937 |

FOREIGN PATENT DOCUMENTS

| | | |
|---|---|---|
| CN | 105652800 | 6/2016 |
| CN | 107153404 | 9/2017 |
| DE | 11 2015 004 939 | 8/2017 |
| EP | 2 871 547 | 5/2015 |
| JP | 4-76606 | 3/1992 |
| JP | 04-331037 | 11/1992 |
| JP | 7-334222 | 12/1995 |
| JP | 09-29584 | 2/1997 |
| JP | 9-265310 | 10/1997 |
| JP | 09-269808 | 10/1997 |
| JP | 2000-89814 | 3/2000 |
| JP | 2000-311010 | 11/2000 |
| JP | 2001-125618 | 5/2001 |
| JP | 2002-96243 | 4/2002 |
| JP | 2003-334740 | 11/2003 |
| JP | 2004-284002 | 10/2004 |
| JP | 2005-004254 | 1/2005 |
| JP | 2005-513665 | 5/2005 |
| JP | 2012-152884 | 8/2012 |
| JP | 2017-156835 | 9/2017 |
| WO | 2011/004585 | 1/2011 |
| WO | 2016/067392 | 5/2016 |

OTHER PUBLICATIONS

Office Action issued in related U.S. Appl. No. 16/155,298 dated Nov. 4, 2020.
Office Action dated Apr. 28, 2021 in U.S. Appl. No. 16/155,298.
Office Action dated Dec. 21, 2021 in related German Patent Application No. 10 2018 218 202.7, with English Translation.
Week, M. et al. "Werkzeugmaschinen. Bd. 4. Automatisierung von Maschinen und Anlagen" 6., neu bearb. Aufl.. Berlin [u.a.] : Springer, 2006, pp. 218-228, cited in CA.
Office Action dated Sep. 10, 2021 in U.S. Appl. No. 16/155,298.
Office Action dated Jun. 20, 2022 in U.S. Appl. No. 16/155,298.
Office Action dated Jan. 9, 2020 in U.S. Appl. No. 16/155,298.
Notification of Reasons for Refusal dated Jul. 23, 2019 in Japanese Patent Application No. 2017-209757.

* cited by examiner

NUMERICAL CONTROLLER, CNC MACHINE TOOL, NUMERICAL CONTROL METHOD, AND COMPUTER-READABLE INFORMATION STORAGE MEDIUM

This application is based on and claims the benefit of priority from Japanese Patent Application. No. 2017-209752, filed on 30 Oct. 2017, the content of which is incorporated herein by reference.

BACKGROUND OF THE INVENTION

Field of the Invention

The present invention relates to a numerical controller, a CNC machine tool, a numerical control method, and a computer-readable information storage medium.

Related Art

Machining of a characteristic shape accurately such as an edge or a smooth surface is important during machining, particularly during die cutting. Hence, a desired machining system is to perform machining process responsive to a characteristic shape such as an edge or a smooth surface by incorporating information about this characteristic shape into cutter location data (CL data) or numerical control data (NC data), for example. However, conventional G-code in a machining program has found difficulty in determining from a tool path whether a workpiece is a smooth curved surface or an edge.

For example, patent documents 1 and 2 disclose machining program generators that generate a machining program in consideration of the shape of a workpiece. Patent document 1 describes an NC data generator capable of generating numerical data to be used for facilitating machining of a shape added to a ridge section. More specifically, the NC data generator includes: extraction means that extracts a graphic element having the ridge section from shape data prepared in advance indicating a workpiece and extracts annotation data added to the ridge section in the extracted graphic element; interpretation means that interprets a shape added to the ridge section based on the extracted annotation data; and numerical data generation means that generates numerical data defining a tool path for the ridge section based on a result of the interpretation by the interpretation means.

Patent document 2 describes a machining controller for allowing machining even by an operator with little experience and for preventing repetition of similar failures. More specifically, the machining controller allows machining under an appropriate machining condition by searching for a machining case in response to a characteristic of a shape to be machined, and setting a machining condition based on the searched machining case.

Patent Document 1: Japanese Unexamined Patent Application, Publication No. 2001-125618
Patent Document 2: Japanese Unexamined Patent Application, Publication No, 2004-284002

SUMMARY OF THE INVENTION

The invention described in patent document 1 is to read a corner R, etc. illustrated as an annotation in a drawing and to add chamfering, for example. Hence, patent document 1 is not to perform machining process responsive to a characteristic shape such as an edge or a smooth surface by incorporating this characteristic shape into CL data or NC data, for example. The machining controller described in patent document 2 is to search for a machining case in the past in response to a characteristic of a shape to be machined and to set a machining condition based on the searched machining case. Hence, patent document 2 is not to perform machining process responsive to a characteristic shape such as an edge or a smooth surface by incorporating this characteristic shape into CL data or NC data, for example.

The present invention is intended to provide a numerical controller, a CNC machine tool, a numerical control method, and a computer-readable information storage medium for reading information about a characteristic shape such as an edge or a smooth surface, for example, in a machining program to calculate a control command appropriate for machining process of the characteristic shape by incorporating the information about the characteristic shape into the machining program.

(1) A numerical controller according to the present invention is a numerical controller (numerical controller 310 described later, for example) that controls a motor for driving at least one axis based on a machining program including information about a characteristic shape. The numerical controller comprises:

a characteristic shape reading unit (characteristic shape reading unit 311 described later, for example) configured to read information about a characteristic shape to be machined from a machining program including information about a characteristic shape;

a section setting unit (section setting unit 312 described later, for example) configured to set one or more set sections on a tool path in response to the information about the characteristic shape; and a motion parameter change unit (motion parameter change unit 313 described later, for example) configured to change at least one parameter to be used for controlling the at least one axis outside the set section and inside the set section.

(2) in the numerical controller described in (1), the parameter may include at least one of parameter sets (A), (B), and (C) as follows:
(A) a command speed, an allowable acceleration, an allowable jerk, and a time constant related to acceleration/deceleration control, for a feed axis;
(B) a command speed, an allowable acceleration, an allowable jerk, and a time constant related to acceleration/deceleration control, for a spindle; and
(C) an error amount allowed between a command path and an actual path.

(3) In the numerical controller described in (1) or (2), the information about the characteristic shape may include at least one of information sets (a), (b), (c), and (d) as follows:
(a) information about an edge position on the contour of a workpiece;
(b) information about a corner to be smoothened on the contour of a workplace;
(c) information about a section in which a tool contacts an edge of a workpiece, on the tool path; and
(d) information about a section in which a tool path is a smooth curve, on the tool path.

(4) in the numerical controller described in any one of (1) to (3), the parameter may include a feed speed of a feed axis and a spindle speed, and the motion parameter change unit may change the spindle speed in synchronization with change in the feed speed of the feed axis.

(5) In the numerical controller described in any one of (1) to (4), the machining program may include information about the geometry of a workpiece or a tool path and information about machining content, the informations being described in a format conforming to a data model having a hierarchical structure.

(6) A CNC machine tool according to the present invention (CNC machine tool 30 described later, for example) may comprise the numerical controller (numerical controller 310 described later, for example) described in any one of (1) to (5).

(7) A numerical control method according to the present invention is implemented by a numerical controller that controls a motor for driving at least one axis based on a machining program including information about a characteristic shape. The numerical control method comprises:
reading information about a characteristic shape to be machined from a machining program including information about a characteristic shape;
setting one or more set sections on a tool path in response to the information about the characteristic shape; and
changing at least one parameter to be used for controlling the at least one axis outside the set section and inside the set section.

(8) A non-transitory computer-readable information storage medium according to the present invention stores a program for numerical control that causes a computer functioning as a numerical controller that controls a motor for driving at least one axis based on a machining program including information about a characteristic shape to perform:
a process of reading information about a characteristic shape to be machined from a machining program including information about a characteristic shape;
a process of setting one or more set sections on a tool path in response to the information about the characteristic shape; and
a process of changing at least one parameter to be used for controlling the at least one axis outside the set section and inside the set section.

The present invention is capable of providing a numerical controller, a CNC machine tool, a numerical control method, and a computer-readable information storage medium for reading information about a characteristic shape such as an edge or a smooth surface, for example, in a machining program to calculate a control command appropriate for machining process of the characteristic shape by incorporating the information about the characteristic shape into the machining program.

DETAILED DESCRIPTION OF THE INVENTION

Figure 1:
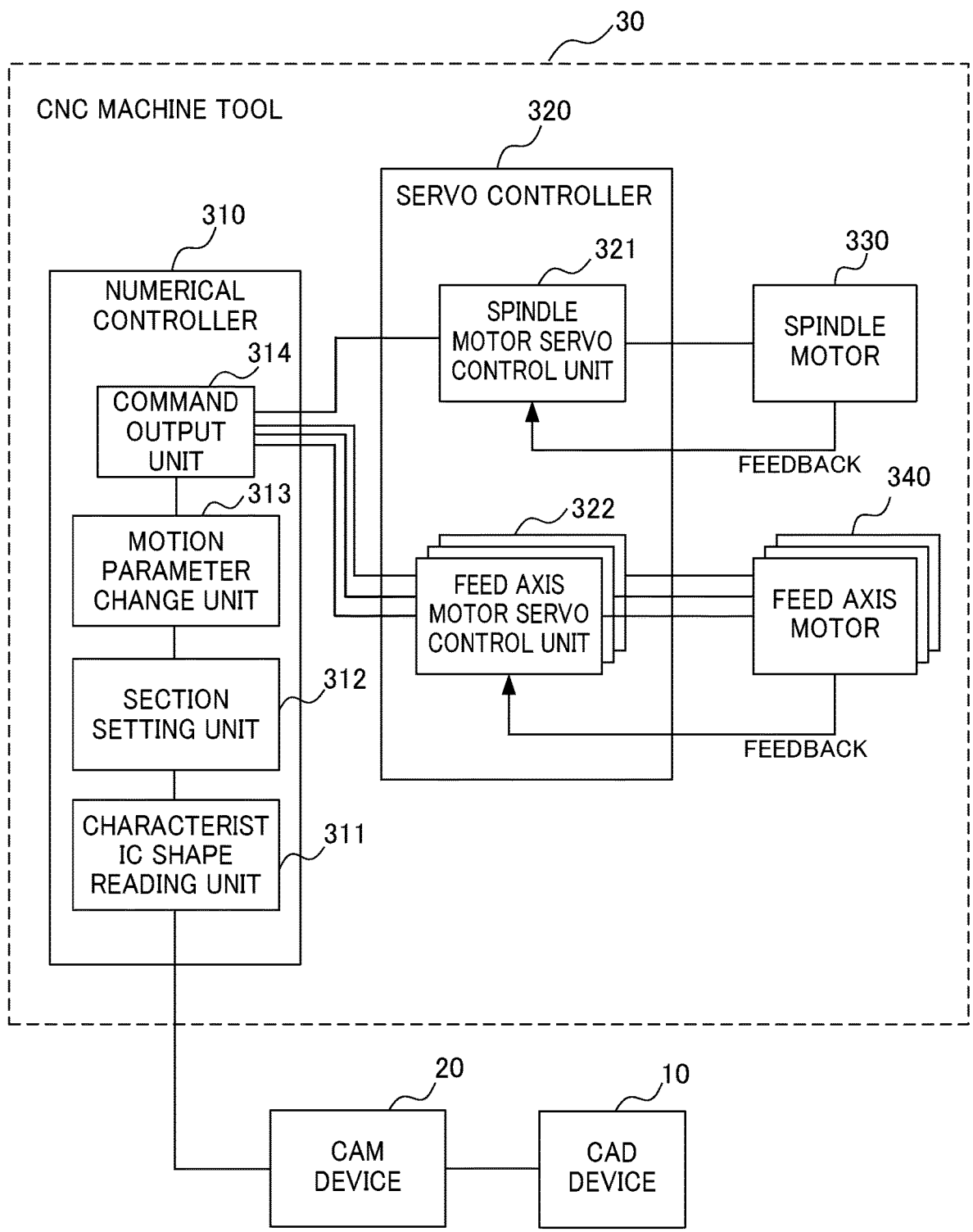
FIG. 1 is a block diagram showing an exemplary configuration of a CNC machine tool according to an embodiment of the present invention.

An embodiment of the present invention will be described in detail below by using the drawings. FIG. 1 is a block diagram showing an exemplary configuration of a CNC machine tool according to the embodiment of the present invention. As shown in FIG. 1, a computerized numerical control (CNC) machine tool 30 includes a numerical controller 310, a servo controller 320, a spindle motor 330, and a feed axis motor 340.

The CNC machine tool 30 is a 3-axis machine tool, for example. In FIG. 1, only the spindle motor 330 and the feed axis motor 340 are shown as units of the 3-axis machine tool responsible for machining. The spindle motor 330 rotates a tool such as a ball endmill. The feed axis motor 340 includes three motors: a motor for an X-axis direction, a motor for a Y-axis direction, and a motor for a Z-axis direction. The motor for the X-axis direction and the motor for the Y-axis direction move a table linearly in the X-axis direction and the Y-axis direction respectively through a ball screw, for example, with a substrate for forming a workpiece placed on the table. The motor for the Z-axis direction moves the tool or the table linearly in the Z-axis direction. The foregoing is not the limited configuration of the 3-axis machine tool. The 3-axis machine tool may be configured to move the table linearly in the X-axis direction, the Y-axis direction, and the Z-axis direction while the tool is fixed, or may be configured to move the tool linearly in the X-axis direction, the Y-axis direction, and the Z-axis direction while the table is fixed, for example. The CNC machine tool 30 is not limited to the 3-axis machine tool but may be a 5-axis machine tool, for example.

The numerical controller 310 includes a characteristic shape reading unit 311, a section setting unit 312, a motion parameter change unit 313, and a command output unit 314. The configuration and the motion of the numerical controller 310 will be escribed in detail later.

A machining program to be input into the numerical controller 310 is generated by a CAM device 20 using CAM software based on the shape of a workpiece generated by a CAD device 10, for example. The CAM device 20 sets the motion of a tool or a machine tool so as to acquire a geometry based on CAD data, converts the set motion to cutter location data (CL data), and generates a machining program based on the resultant CL data. The CAD device 10 and the CAM device 20 may be integrated and configured in one computer. The respective configurations of the CAD device 10 and the CAM device 20 are well known to a person skilled in the art, so that they will not be described in detail.

A spindle motor servo control unit 321 controls the spindle motor 330 based on a control command from the command output unit 314. Three feed axis motor servo control units 322 for the X axis, the Y axis, and the Z axis control corresponding ones of the three feed axis motors 340 for the X axis, the Y axis, and the Z axis based on control commands from the command output unit 314. The spindle motor servo control unit 321 and the three feed axis motor servo control units 322 each include a position control unit and a speed control unit for forming a position feedback loop and a speed feedback loop, a motor drive amplifier for driving a spindle motor or a feed axis motor based on a torque command value, an operator's panel for accepting operation from a user, etc.

The spindle motor servo control unit 321 calculates a backlash compensation value using a position feedback signal from a position detector such as an encoder connected to the spindle motor 330 and a position command output from the numerical controller 310, and compensates for the position command. The three feed axis motor servo control units 322 each calculate a backlash compensation value using a position feedback signal from a position detector such as an encoder coupled to a corresponding one of the three feed axis motors 340 and a position command output from the numerical controller 310, and compensates for the position command. The internal configuration of the spindle motor servo control unit 321 and those of the three feed axis motor servo control units 322 are well known to a person skilled in the art, so that they will not be described in detail and are not illustrated in detail in the drawings.

The foregoing CNC machine tool may include the CAD device 10 or the CAM device 20. The numerical controller 310 may include the servo controller 320.

<Numerical Controller 310>

Figure 2:
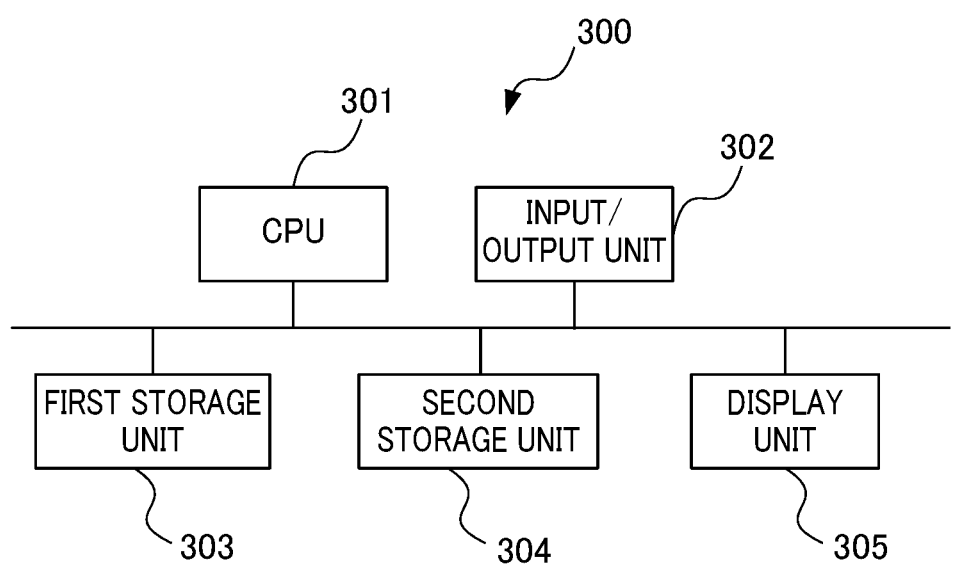
FIG. 2 is a block diagram showing the configuration of a computer relating to a numerical controller.

An example of the configuration of the numerical controller 310 will be described next. FIG. 2 shows the hardware configuration of the numerical controller 310. As shown in FIG. 2, a computer 300 forming the numerical controller 310 at least includes a CPU 301, an input/output unit 302, a first storage unit 303, a second storage unit 304, and a display unit 305. The CPU 301, the input/output unit 302, the first storage unit 303, the second storage unit 304, and the display unit 305 are connected through a bus.

The CPU 301 is configured using a microprocessor with a CPU, a RAM, a ROM, an I/O, etc., for example. The CPU 301 executes a program read from the first storage unit 303 such as a hard disk drive or a ROM, for example. For execution of the program, the CPU 301 receives a machining program through the input/output unit 302, for example, reads information from the first storage unit 303 or the second storage unit 304 such as a RAM, for example, and writes information resulting from operation into the first storage unit 303 or the second storage unit 304. The CPU 301 transmits and receives signals to and from the display unit 305 and the input/output unit. 302, and displays the contents of the processing on the display unit 305, for example.

The CPU 301 executes programs forming numerical control software (these programs will also be called an "numerical control application" collectively), thereby causing the computer 300 to function as the numerical controller 310. More specifically, as shown in FIG. 1, the CPU 301 causes the computer 300 to function as the numerical controller 310 including the characteristic shape reading unit 311, the section setting unit 312, the motion parameter change unit 313, and the command output unit 314. The CPU 301 executes a program to cause the computer 300 to follow predetermined procedures (hereinafter also called a "numerical control procedure" collectively). A function belonging to the CPU 301 will be described below from the viewpoint of the numerical controller 310. A function belonging to the CPU 301 from the viewpoint of the numerical control procedure (method) to be followed by the numerical controller 310 will not be described as it can be understood by replacing a "unit" by a "procedure."

Before description of each functional unit of the numerical controller 310 is given, a machining program to be input into the numerical controller 310 will be described.

<Machining Program>

In one case, a machining program to be input into the numerical controller 310 is given the shape of a machining surface. In another case, a machining program to be input into the numerical controller 310 is given a tool path resulting from offsetting of a tool shape to conform to the shape of a machining surface. If a machining program is given the shape of a machining surface, the numerical controller 310 generates a tool path through tool shape compensation. If a machining program is given the shape of a machining surface, the machining program includes information pieces from information Inf1A to Information Inf5A as follows:

(Inf1A) information about the shape of a machining surface;
(Inf2A) information about a characteristic shape on a machining surface;
(Inf3A) information about a tool used for machining;
(Inf4A) information about a machining condition; and
(Inf5A) information about order of machining.

If a machining program is given a tool path resulting from offsetting of a tool shape to conform to the shape of a machining surface, the machining program includes information pieces from information Inf1B to Information Inf5B as follows: (Inf1B) information about a tool path;
(Inf2B) information about a characteristic shape on a tool path;
(Inf3B) information about a tool used for machining;
(Inf4B) information about a machining condition; and
(Inf5B) information about order of machining.

The information Inf1A (=information about the shape of a machining surface) includes information about the contour shape of a workpiece, for example. The information Inf2A (=information about a characteristic shape on a machining surface) includes characteristic point information describing a characteristic of one point forming the shape of a machining surface. The characteristic point information includes information about an edge position on the contour of a workpiece, or information about a corner to be smoothened on the contour of a workpiece, for example. The information about the corner to be smoothened is a start point and an end point of a smoothing section, the position of the corner, or an angle of the corner on the contour of the workpiece, for example. The information Inf3A (=information about a tool used for machining) includes information about the type, dimension, etc. of a tool, for example. The information Inf4A (=information about a machining condition) includes information about a feed speed on a machining surface, a spindle speed on the machining surface, or use of a cutting fluid, for example. The information inf5A (=information about order of machining) includes information about order in which machining steps are performed, etc.

The information Inf1B (=information about a tool path) includes information about a tool path, etc. resulting from offsetting of a tool shape to conform to the contour shape of a workpiece, for example. The information Inf2B (=information about a characteristic shape on a tool path) includes characteristic section information describing a characteristic in a certain section on a tool path. The characteristic section information includes information about an edge section in which a tool contacts an edge of a workpiece on a tool path, or information about a smoothing section in which a tool path is a smooth curve, on the tool path, for example. The information Inf3B (=information about a tool used for machining) includes information about the type, dimension, etc, of a tool, for example. The information Inf4B (=information about a machining condition) includes information about a feed speed on a tool path, a spindle speed on the tool path, or use of a cutting fluid, for example. The information Inf5B (=information about order of machining) includes information about order in which machining steps are performed, etc. The information Inf2A, the information Inf4A, the information Inf2B, and the information. Inf4B are particularly important for processing by the numerical controller 310.

For reference, a data model for the machining program including the foregoing information pieces has a hierarchical structure such as ISO 14649, for example. As long as the hierarchical structure of the data model for the machining program has a format allowing necessary information to be described appropriately, however, ISO 14649 is not the only example.

Figure 3:
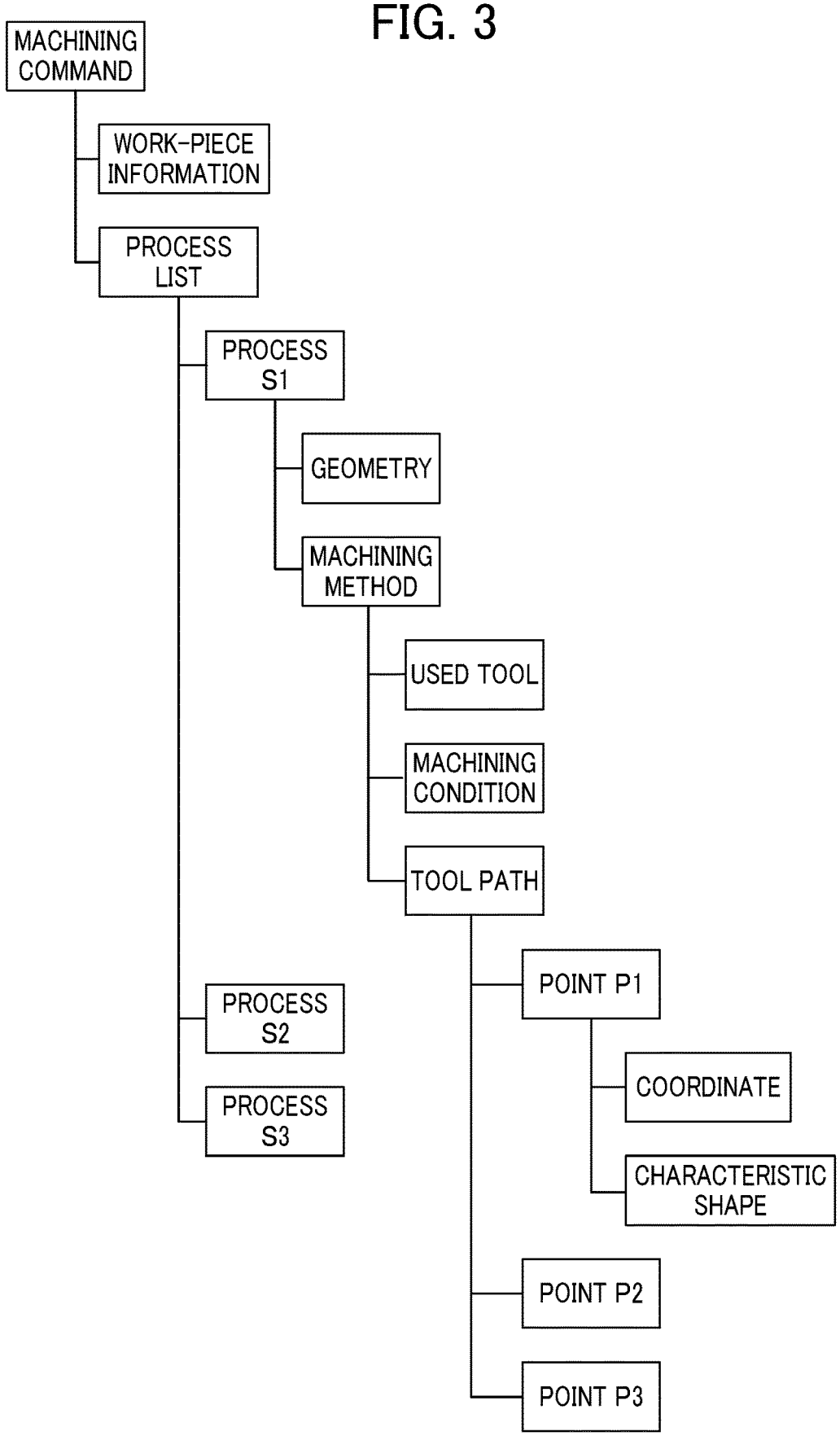
FIG. 3 is a configurational view showing an example of a data model based on ISO 14649.

FIG. 3 is a configurational view showing the hierarchical structure of a data model based on ISO 14649. The information Inf2A (=information about a characteristic shape on a machining surface) and the information Inf2B (=information about a characteristic shape on a tool path) are not contained in the hierarchical structure of the data model based on ISO 14649. Hence, the information Inf2A (=information about a characteristic shape on a machining surface) may be set as "geometry" (or as structural data subordinate to "geometry") in this hierarchical structure of the data model, for example. Further, the Inf2B (=information about a characteristic shape on a tool path) may provisionally be set as "characteristic shape" corresponding to structural data subordinate to "tool path" in this hierarchical structure of the data model.

Referring to the hierarchical structure of the data model shown in FIG. 3, the information Inf1A (=information about the shape of a machining surface) can be described in "geometry," and the information Inf1B (=information about a tool path) can be described in "tool path." The information Inf2A (=information about a characteristic shape on a machining surface) or the information Inf2B (=information about a characteristic shape on a tool path) can be described in "characteristic shape," the information Inf3A or the information Inf3B (=information about a tool used for machining) can be described in "used tool," the information Inf4A or the information Inf4B (=information about a machining condition) can be described in "machining condition," and the information Inf5A or the information Inf5B (=information about order of machining) can be described in "step list," for example. By doing so, the machining program including information pieces from the information Inf1A to the information Inf5A, or information pieces from the information Inf1B to the information Inf5B can be described as information having a structure defined based on the data model. For example, information pieces from the information Inf1A to the information Inf5A, or information pieces from the information Inf1B to the information Inf5B may be inserted into the machining program as comments in the form of information in text tagged by means (such as XML).

The information contained in the machining program to be input into the numerical controller 310 is as described above.

Each functional unit of the numerical controller 310 will be described next.

The characteristic shape reading unit 311 reads a machining program generated by the CAM device 20, for example, and including information pieces from the information Inf1A to the information Inf5A, or information pieces from the information Inf1B to the information Inf5B. Next, the characteristic shape reading unit 311 detects every information Inf2A (=information about a characteristic shape on a machining surface) or every information Inf2B (=information about a characteristic shape on a tool path) contained in the machining program in each machining step.

If the characteristic shape reading unit 311 determines that the information Inf2A is about an edge position on a geometry, for example, the characteristic shape reading unit 311 acquires this edge position, acquires the contour shape of a machining surface from the information Inf1A, and acquires information about a machining condition from the information Inf4A such as a feed speed for cutting the machining surface or a spindle speed for cutting the machining surface, for example. If the characteristic shape reading unit 311 determines that the information Inf2A is about a corner to be smoothened on a geometry, for example, the characteristic shape reading unit 311 acquires information about the corner to be smoothened, acquires the contour shape of a machining surface from the information Inf1A, and acquires information about a machining condition from the information Inf4A such as a feed speed for cutting the machining surface or a spindle speed for cutting the machining surface, for example.

If the characteristic shape reading unit 311 determines that the information Inf2B is about an edge section on a tool path, for example, the characteristic shape reading unit 311 acquires information about the edge section (a start point of the edge section and an end point of the edge section, etc.). Further, the characteristic shape reading unit 311 acquires a tool path from the information Inf1B resulting from offsetting of a tool shape to conform to the shape of a machining surface, and acquires information about a machining condition from the information Inf4B such as a feed speed on a tool path including this edge section or a spindle speed on the tool path. If the characteristic shape reading unit 311 determines that the information Inf2B is about a smoothing section in which a tool path is a smooth curve, on the tool path, for example, the characteristic shape reading unit 311 acquires information from the information Inf1B about a tool path given as a continuous straight line in this smoothing section, and information from the information Inf2B about a smoothing section on the tool path in which a shape is smoothened. The smoothing section information can include information about a start point and an end point of the smoothing section, and a change rate of a tool direction (showing a degree to which a traveling direction of a tool changes while the tool travels a constant distance) allowed in the smoothing section. Further, the characteristic shape reading unit 311 acquires information about a machining condition from the information Inf4B such as a feed speed on a tool path including this smoothing section or a spindle speed on the tool path.

The section setting unit 312 sets a constant section on a tool path based on each information Inf2A (=information about a characteristic shape on a machining surface) or each information Inf2B (=information about a characteristic shape on a tool path) detected by the characteristic shape reading unit 311.

Figure 4:
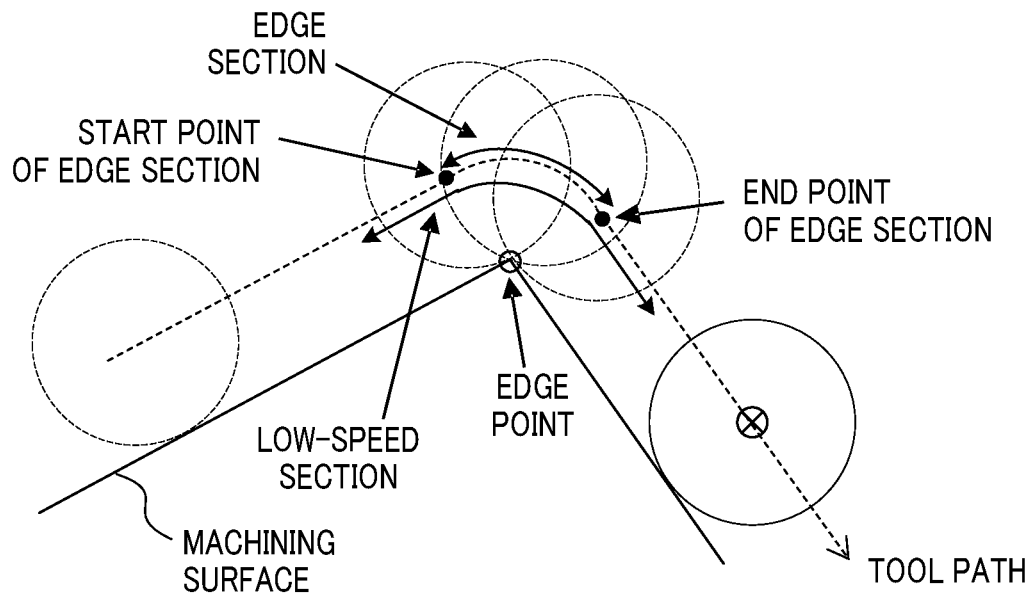
FIG. 4 is an explanatory view showing an example of use of information about an edge position as characteristic section information.

More specifically, the information Inf2A detected by the characteristic shape reading unit 311 is about an edge position on a geometry, the section setting unit 312 generates a tool path through tool offset based on the shape of a machining surface in the information Inf1A and tool information in the information Inf3A. During generation of the tool path, the section setting unit 312 sets a section in which a tool contacts an edge position as an edge section. The tool information can be registered in advance at the numerical controller 310. The section setting unit 312 sets a low-speed section automatically on the tool path including the edge section. As shown in FIG. 4, for example, the low-speed section is set to be larger than the edge section. Processing relating to setting of the low-speed section will be described in detail later.

Figure 5:
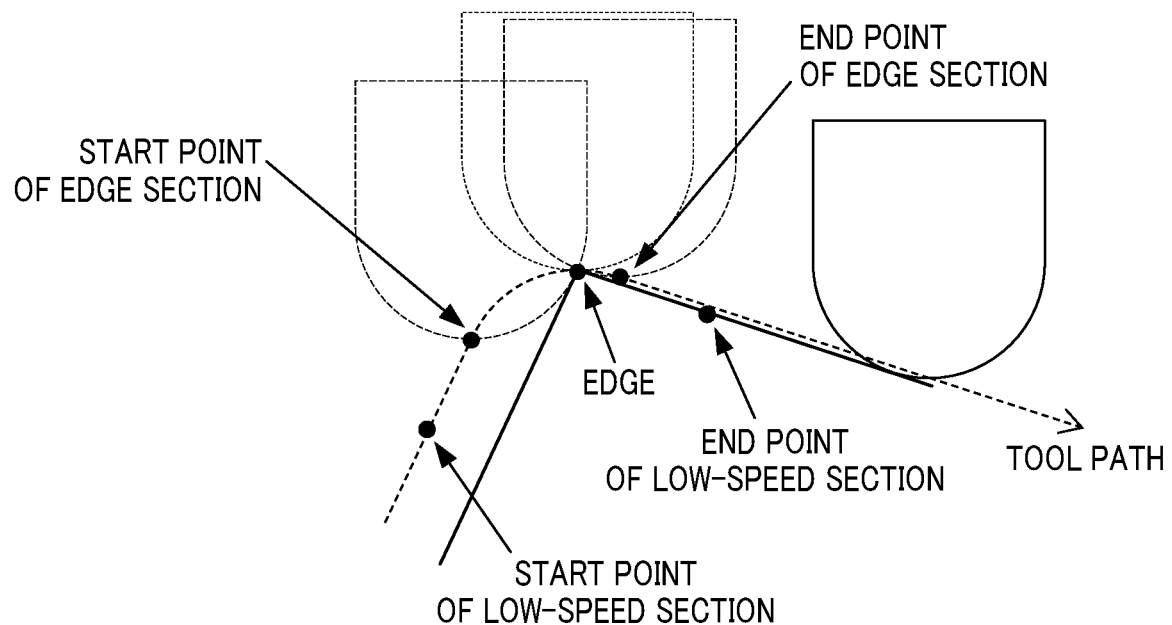
FIG. 5 is an explanatory view showing an example of use of information about an edge section as characteristic section information.

If the information Inf2B detected by the characteristic shape reading unit 311 is about an edge section in which a tool contacts an edge of a workpiece on a tool path, the section setting unit 312 sets a low-speed section automatically on the tool path including the edge section. As shown in FIG. 5, for example, a start point and an end point of the lowspeed section are set in such a manner that the low-speed section becomes larger than the edge section. A range of the low-speed section may be determined in advance, or may be calculated in response to a machining condition. Processing relating to setting of the low-speed section will be described in detail later.

Figure 6:
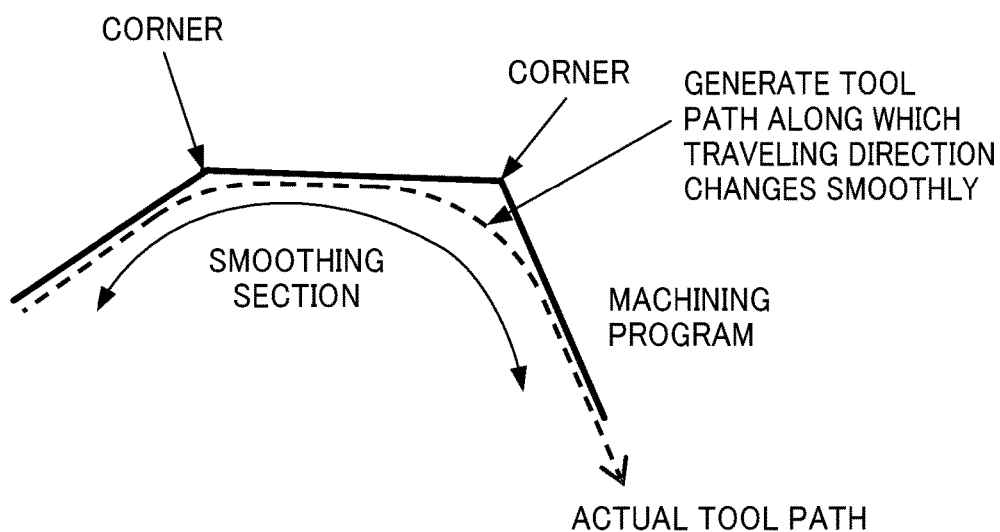
FIG. 6 is an explanatory view showing an example of use of information about a corner to be smoothened on the contour of a machining surface as characteristic section information.

If the information Inf2A detected by the characteristic shape reading unit 311 is about a corner to be smoothened on the contour of a machining surface, the section setting unit 312 generates a tool path through tool offset based on the shape of a machining surface in the information Inf1A and tool information in the information Inf3A. During generation of the tool path, the section setting unit 312 sets a section including the corner as a smoothing section using information about the corner (such as the position of the corner), as shown in FIG. 6. The tool information can be registered in advance at the numerical controller 310. Processing relating to setting of the smoothing section will be described in detail later.

Figure 7:
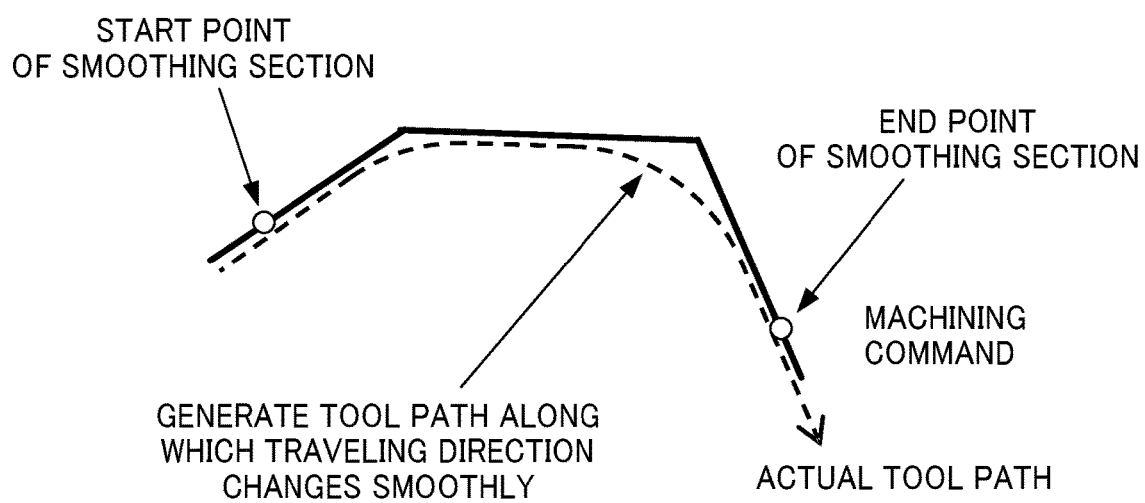
FIG. 7 is an explanatory view showing an example of use of information about a smoothing section as characteristic section information.

If the section setting unit 312 recognizes that the information Inf2B detected by the characteristic shape reading unit 311 is about a smoothing section, the section setting unit 312 sets a smoothing section on a tool path based on the smoothing section information. More specifically, the section setting unit 312 sets a smoothing section on a tool path based on the given smoothing section information. The smoothing section set by the section setting unit 312 is a section set on a tool path based on the foregoing smoothing section information. For example, a start point and an end point shown in FIG. 7 agree with corresponding points described in the smoothing section information. The section setting unit 312 generates a new tool path most approximate to a tool path given by a broken line while setting a change rate of a tool direction at a value not exceeding an allowance in the smoothing section. The section setting unit 312 may generate a tool path having high-order continuity (generally called G2 continuity or G3 continuity) by further setting an allowance for a change rate of a traveling direction.

As described above, the section setting unit 312 sets a constant section on a tool path based on each information Inf2A (=information about a characteristic shape on a machining surface) or each information Inf2B (=information about a characteristic shape on a tool path) in a machining program (NC data). The motion parameter change unit 313 sets a parameter to be used for controlling motion in the constant section on the tool path set by the section setting unit 312, generates a part of control data, and replaces control data input from the machining program (NC data) by the generated part. Processing relating to generation of a part of control data to be used for controlling motion in a section will be described in detail later.

The motion parameter change unit 313 may set a parameter belonging to the control data and to be used for controlling motion outside a set section, generate a part of the control data including the parameter, and replace the control data input from the machining program (NC data) by the generated part. If the set section is an edge section, for example, the motion parameter change unit 313 calculates a speed command in the control data for settling a feed speed again at a feed speed F1 outside the section after passage through a low-speed section. If the set section is a smoothing section, the motion parameter change unit 313 may calculate a speed command in the control data for making a change to a first machining mode after passage through the smoothing section, for example. The parameters for an area inside a constant section and an area outside the constant section generated by the motion parameter change unit 313 are parameters in one, or two or more of the following parameter sets (1), (2), and (3), for example:

(1) a command speed, an allowable acceleration, an allowable jerk, and a time constant related to acceleration/deceleration control, for a feed axis;

(2) a command speed, an allowable acceleration, an allowable jerk, and a time constant related to acceleration/deceleration control, for a spindle; and (3) an error amount allowed between a command path and an actual path. The control data generated in the foregoing manner is output to the command output unit 314.

The command output unit 314 outputs a control command based on the control data generated by the motion parameter change unit 313 to the spindle motor servo control unit 321 in the servo controller 320 and the three feed axis motor servo control units 322 for the X axis, the Y axis, and the Z axis in the servo controller 320. This allows the servo controller 320 to perform machining process in an edge section and/or a smoothing section, for example.

First Example of Use of Characteristic Point Information: Information About Edge Position The following explains an example of characteristic point information by describing processing relating to an edge position by the section setting unit 312 in detail while referring to FIG. 4. In this example of use, a machining program includes the information Inf1A describing the contour shape (geometry) of a machining surface, the information Inf2A describing information about an edge position on a contour, and the information Inf4A describing information about machining conditions such as a feed speed on a tool path for cutting the machining surface, a spindle speed on the tool path, etc. The section setting unit 312 generates a tool path through tool offset based on the contour shape of the machining surface and tool information. During generation of the tool path, the section setting unit 312 sets a section in which a tool contacts an edge position as an edge section. The tool information can be registered in advance at the numerical controller 310, or can be incorporated in the machining program. The section setting unit 312 sets a low-speed section automatically on the tool path including the edge section. As shown in FIG. 4, the section setting unit 312 determines the low-speed section to be larger than the edge section. Processing of setting the low-speed section and processing by the motion parameter change unit 313 are the same as those in a second example of use described next and will be described in detail in the following second example of use.

Second Example of Use of Characteristic Section Information: Information about Edge Section The following explains an example of characteristic section information by describing processing relating to an edge section by the section setting unit 312 and the motion parameter change unit 313 in detail while referring to FIG. 5. In this example of use, a machining program includes the information Inf2B describing information about an edge section, and the information Inf4B describing information about machining conditions such as a feed speed on a tool path including the edge section and a spindle speed on the tool path, etc.

The section setting unit 312 sets a low-speed section automatically on the tool path including the edge section. As shown in FIG. 5, the section setting unit 312 sets a start point and an end point of the low-speed section in such a manner that the low-speed section becomes larger than the edge section. If the machining program includes the information Inf2B describing information about an edge section, a range of the low-speed section may be determined in advance.

The following explains reason why the low-speed section is set to be larger than the edge section. In a machine tool, if a speed command changes steeply, a load is generally applied to a motor and this may cause rattling of the motor. Hence, in the machine tool, change in a speed command in a machining program is controlled in such a manner that an actual feed speed changes more smoothly (more gently) than a speed in the speed command. Thus, the speed command is calculated so as to set a feed speed F2 appropriate for edge machining in the edge section by starting speed reduction shortly before the edge section to complete deceleration before entry into the edge section, and starting acceleration after passage through the edge section.

Figure 8:
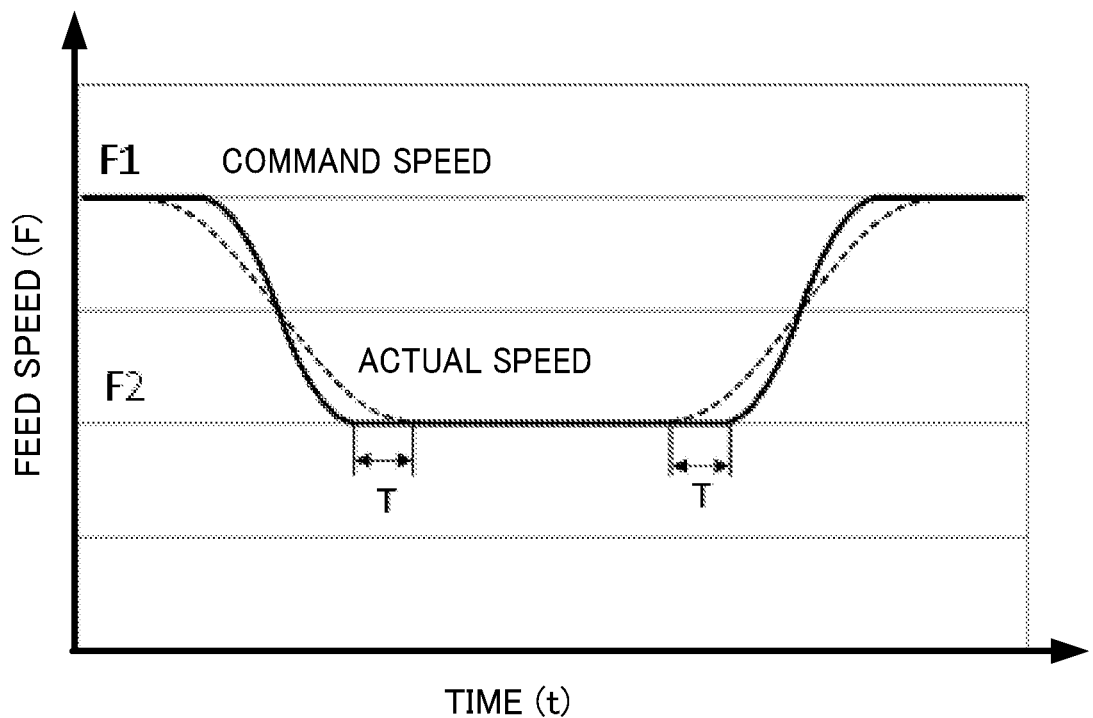
FIG. 8 shows characteristics about a relationship between a command speed and an actual speed determined by changing a feed speed.

FIG. 8 shows exemplary characteristics about a relationship determined by changing a command speed in a speed command between change in the command speed described in a machining program and actual speed change controlled so as to be smoother (gentler) than the change in the command speed in a machine tool. A solid line shows the chance in the command speed described in the machining program (NC data). A dashed line shows the actual speed change controlled so as to be smoother (gentler) than the change in the command speed in the machine tool in this example, assuming that a time constant is T, an actual speed of a tool at given time t corresponds to the average of a command speed at time (t−time constant T) and a command speed at time (t+time constant T) as shown in FIG. 8, for example. Hence, giving a command immediately before a start point of an edge section so as to set a feed speed in the edge section at F2 actually makes the tool enter the edge section while deceleration of the tool is not finished. Regarding an end point of the edge section, giving a command so as to start acceleration at the end point of the edge section actually accelerates the tool before the tool exits the edge section. To avoid the occurrence of such a situation, the section setting unit 312 sets a point before the start point of the edge section and separated from the start point of the edge section by a distance corresponding to the time constant T (nearly F2×T) as a start point of a low-speed section.

Further, the section setting unit 312 sets a point ahead of the end point of the edge section and separated from the end point of the edge section by F2×T as an end point of the lowspeed section. To calculate the feed speed F2 in the edge section on an as-needed basis, the section setting unit 312 is to calculate a value F2×T also on an as-needed basis. If the feed speed F2 in the edge section is a value determined in advance, P2×T may be given in advance in the information Inf4A or Inf4B (=information about a machining condition), for example.

The motion parameter change unit 313 compares the commanded feed speed F1 on a tool path with the feed speed F2 appropriate for edge machining. If the feed speed F1 is higher than the feed speed F2, the motion parameter change unit 313 describes a speed command in control data in such a manner that a feed speed F3 in the low-speed section does not exceed F2. The feed speed F2 may have a value determined in advance, or a value calculated based on a tool diameter or an edge angle.

Figure 9:
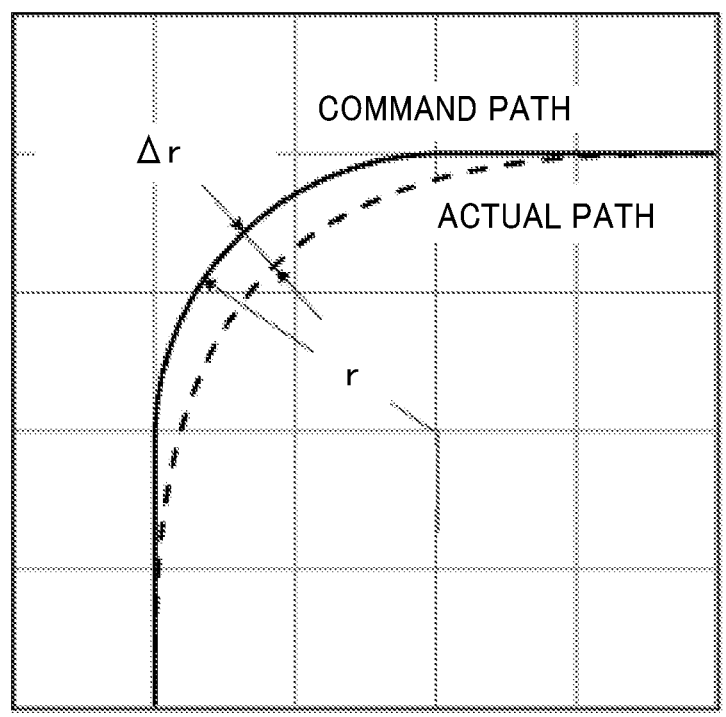
FIG. 9 shows a path radius r and path error Δr.

FIG. 9 shows a path radius r and path error Gr. The path radius r agrees with a tool diameter. The path error (a difference between a command path and an actual path) Δr is the dimension of corner sagging allowed for an edge. An acceleration/deceleration time constant T of a machine is a value dependent on setting of the machine. Basically, if a curve in a tool path becomes steeper and allowable error becomes smaller, a feed speed is required to be lower. The feed speed F2 at which corner sagging does not exceed an allowance is determined by calculating a value that satisfies a relationship in Math. 1, for example. As understood from Math. 1, the feed speed F2 is required to be lower with a smaller tool diameter and with less allowable corner sagging. The feed speed F2 can be registered in advance by being determined based on a tool having the smallest diameter expected to be used and the smallest allowance about corner sagging to occur during machining by a machine using this tool.

$$F2 \propto (\Delta \mathrm{x} r)^{0.5}/T$$

r: PATH RADIUS
Δr: PATH ERROR
T: ACCELERATION/DECELERATION TIME CONSTANT OF MACHINE

As described above, the motion parameter change unit 313 describes a speed command in control data for setting a feed speed again at the feed speed F1 after passage through a low-speed section.

As described above, information about an edge position on a geometry is incorporated into the information Inf2A (=information about a characteristic shape on a machining surface) in a machining program to be input into the numerical controller 310, or information about a characteristic shape such as an edge section is incorporated into the information. Inf2B (=information about a characteristic shape on a tool path) in the machining program. Further, information about a machining condition such as a feed speed for cutting a machining surface or a spindle speed for cutting the machining surface is incorporated into the information Inf4A (=information about a machining condition) in the machining program, or information about a machining condition such as a feed speed on a tool path including this edge section or a spindle speed on the tool path is incorporated into the information Inf4B (=information about a machining condition) in the machining program, for example. By doing so, the numerical controller 310 becomes capable of generating control data to be used for performing machining process at the foregoing edge position or in the foregoing edge section and capable of controlling a machine tool by following a control command based on the generated control data. This facilitates machining of a shape that has not been machined easily by conventional G-code.

Third Example of Use of Characteristic Point Information: Information about Corner to be Smoothened The following explains an example of characteristic point information by describing processing relating to a corner to be smoothened by the section setting unit 312 in detail while referring to FIG. 6. In this example of use, a machining program includes the information Inf1A about a geometry, the information Inf2A about a start point and an end point of a smoothing section, the position of a corner, the angle of the corner, etc. on the contour of a workpiece, and the information Inf4A describing information about machining conditions such as a feed speed for cutting a machining surface, a spindle speed for cutting the machining surface, etc. The section setting unit 312 generates a tool path through tool offset based on the information. Inf1A about the geometry, the information in the information Inf2A about the start point and the end point of the smoothing section, the corner position and the corner angle on the contour of the workpiece, and tool information in the information Inf3A. Then, as shown in FIG. 6, the section setting unit 312 sets a section including the corner as a smoothing section. The tool information can be registered in advance at the numerical controller 310. Processing by the motion parameter change unit 313 to be performed after this setting of the smoothing section on the tool path is the same as that in a fourth example of use described next and will be described in detail in the following fourth example of use.

Fourth Example of Use of Characteristic Section Information: Information about Smoothing Section The following explains an example of characteristic section information by describing processing relating to a smoothing section by the section setting unit 312 and the motion parameter change unit 313 in detail while referring to FIG. 7. In this example of use, a machining program includes the information Inf2B describing information about a smoothing section.

The section setting unit 312 sets a smoothing section on a tool path based on given smoothing section information. As described above, the smoothing section information is information described in a machining program, and including information about a start point and an end point of the smoothing section, and a change rate of a tool direction (showing a degree to which a traveling direction of a tool changes while the tool travels a constant distance) allowed in the smoothing section. The section setting unit 312 sets the smoothing section as a section set on a tool path based on the smoothing section information. The start point and the end point shown in FIG. 7 agree with corresponding points described in the smoothing section information. The section setting unit 312 generates a new tool path most approximate to a tool path given by a broken line while setting a change rate of a tool direction at a value not exceeding an allowance in the smoothing section. The section setting unit 312 may generate a tool path having high-order continuity (generally called G2 continuity or G3 continuity) by further setting an allowance for a change rate of a traveling direction.

The motion parameter change unit 313 replaces an input tool path by a tool path along which line segments are connected smoothly in the smoothing section in such a manner that the dimension of change in a traveling direction for a distance of move of a tool set by the section setting unit 312 does not exceed an allowance. The allowance may be set in advance, or may be described in the smoothing section information, for example.

The motion parameter change unit 313 can increase the smoothness of a curve by adjusting a speed, an allowable acceleration, an allowable jerk, a time constant relating to control over acceleration/deceleration, etc. in a smoothing section, for example. Many CNC machine tools generally have a function of selecting a mode of moving a tool between a first machining mode faithful to a command and a second machining mode giving priority to smoothness. There is also a CNC machine tool capable of selecting the first machining mode or the second machining mode in stages in a manner that depends on a degree of smoothing of a tool path. The first machining mode is a machining mode in which, if a tool path in a machining program is given by a broken line, machining proceeds so as to follow the broken line faithfully. The second machining mode is a machining mode in which, even if a tool path in a machining program is given by a broken line, the tool path is smoothened and machining proceeds smoothly. A maximum allowable acceleration/deceleration of a motor differs between the first machining mode and the second machining mode. A machine operates more faithfully to a command with a higher allowable acceleration/deceleration. The first machining mode or the second machining mode is selected generally before machining. In such a case, if information about a smoothing section is described in the information Inf2B (=information about a characteristic shape on a tool path), the information about the smoothing section can be specified in such a manner that a mode is changed automatically between the inside and the outside of the smoothing section, for example, in such a manner that machining proceeds in the first machining mode faithful to a command outside the smoothing section and machining proceeds in the second machining mode giving priority to smoothness inside the smoothing section. In this case, regarding a parameter for a machining program, a maximum acceleration/deceleration allowed for a motor is to be changed between the inside and the outside of the smoothing section. The information about the smoothing section can also be specified so as to select the first machining mode or the second machining mode in response to a degree of smoothing in the smoothing section. As described above, information about a corner to be smoothed on the contour of a workpiece is incorporated into the information Inf2A (=information about a characteristic shape on a machining surface) in a machining program to be input into the numerical controller 310, or smoothing section information is incorporated into the information Inf2B (=information about a characteristic shape on a tool path) in the machining program, for example. By doing so, the numerical controller 310 becomes capable of generating control data to be used for performing machining process in this smoothing section and capable of controlling a machine tool by following a control command based on the generated control data. This facilitates machining of a shape that has not been machined easily by conventional G-code.

Figure 10:
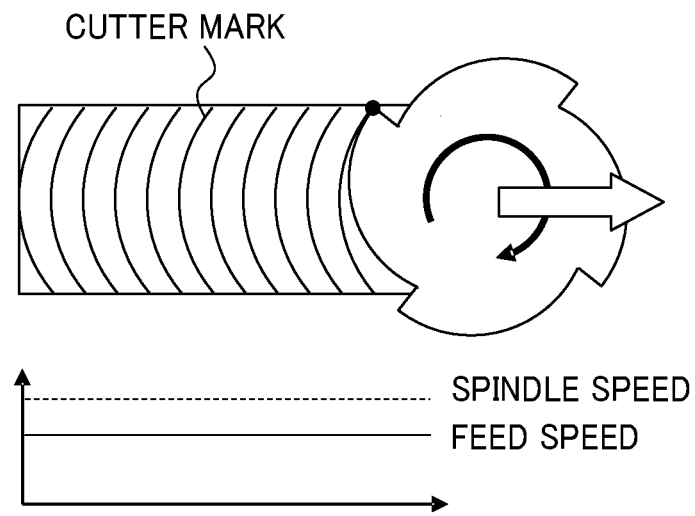
FIG. 10 shows the density of cutter marks with a constant feed speed and a constant spindle speed.
Figure 11:
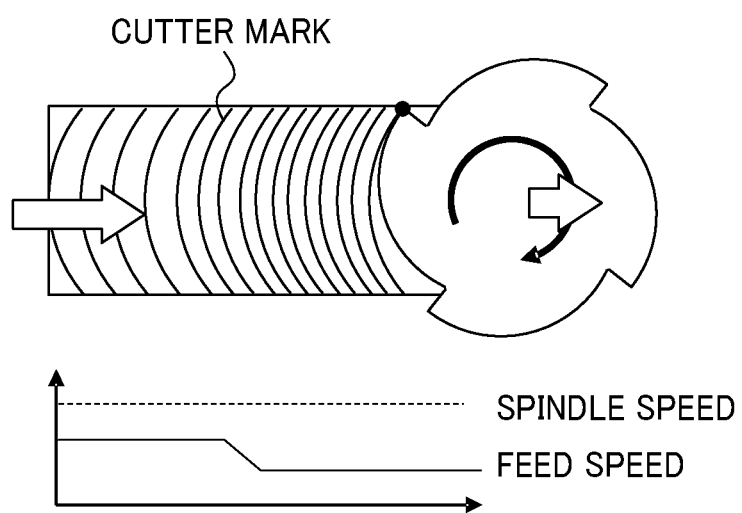
FIG. 11 shows the density of cutter marks with a lower feed speed and a constant spindle speed.
Figure 12:
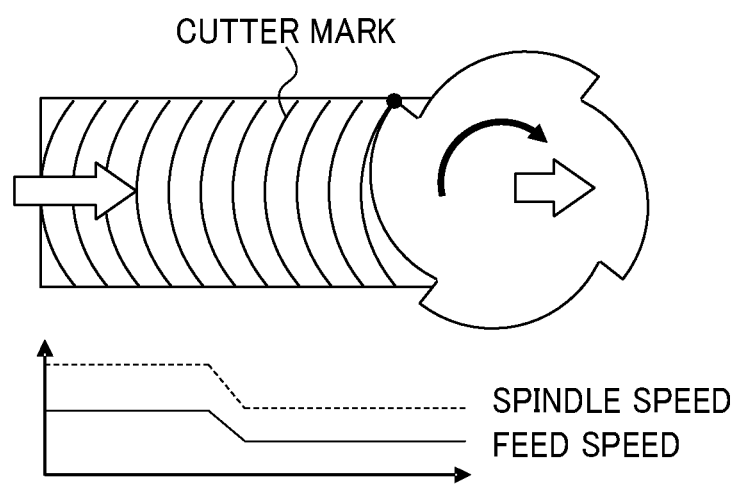
FIG. 12 shows the density of cutter marks with changes both in a feed speed and a spindle speed.

Fifth Example of Use in Control Over Spindle Speed Synchronized with Feed Speed The following describes an example of use in control over a spindle speed synchronized with a feed speed. This example of use is further applicable to the foregoing first to fourth examples of use. When the motion parameter change unit 313 changes a feed speed, the motion parameter change unit 313 preferably changes a spindle rotation speed together with the feed speed. As shown in FIG. 10, for example, if both a feed speed and a spindle speed are at constant values, cutter marks are left at a constant density. The cutter mark mentioned herein is a path of a tool edge left on a machining surface. By contrast, if the feed speed becomes lower while the spindle speed is kept at the constant value, the density of cutter marks changes as shown in FIG. 11 to change the properties and appearance of the machining surface. Hence, to change a feed speed to F2 (<F1) in preparation for process such as process in an edge section on a tool path, for example, along which the feed speed F1 and a spindle speed S1 are specified, the motion parameter change unit 313 preferably changes the spindle rotation speed to a speed S2 (<S1) different from the speed S1, where necessary. In this case, if the motion parameter change unit 313 sets the spindle speed S2 so as to satisfy S2=S1×(F2/F1), the density of cutter marks can be kept at a constant value to achieve a uniform machining surface, as shown in FIG. 12.

Figure 13:
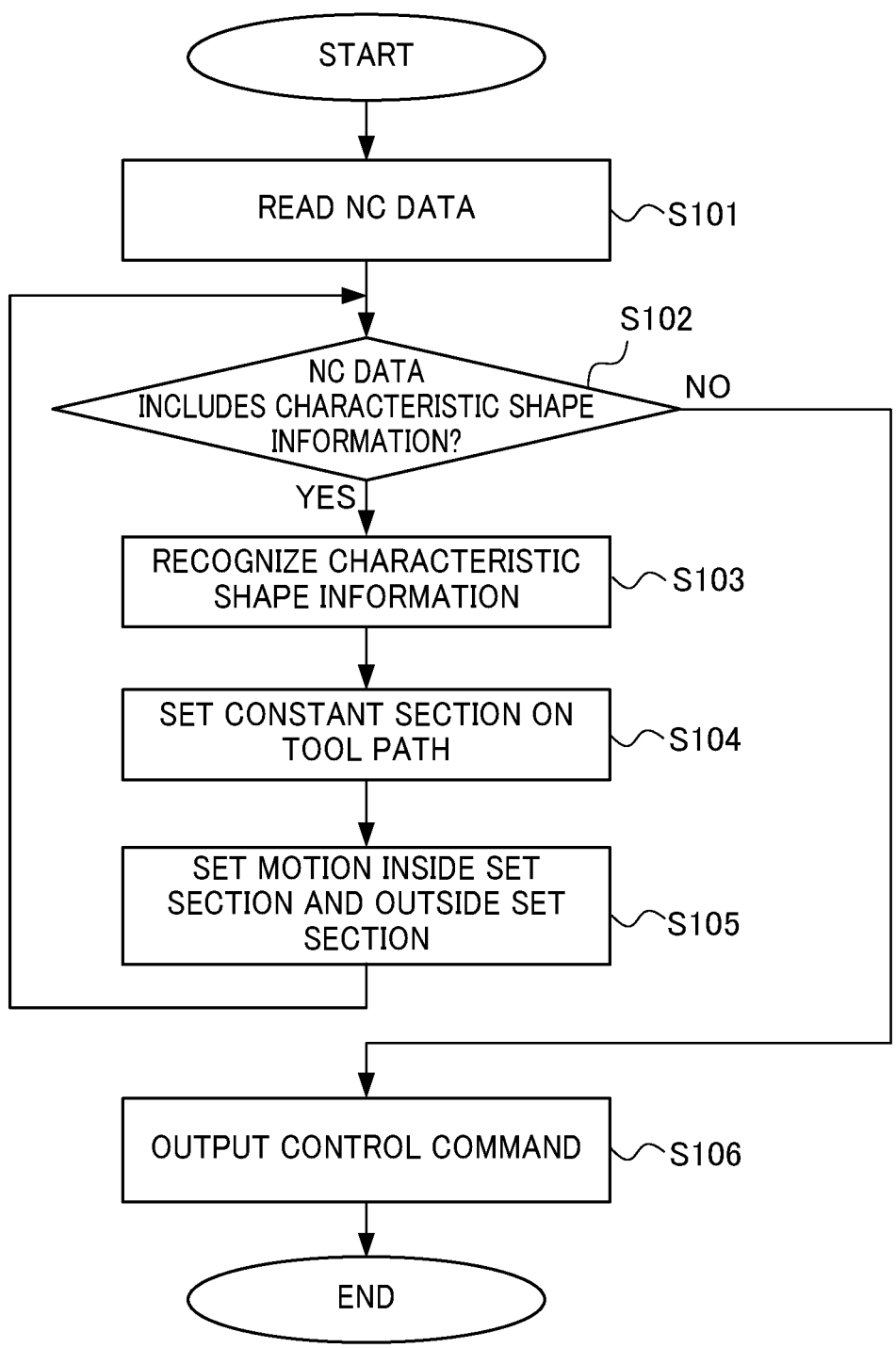
FIG. 13 is a flowchart showing the motion of the numerical controller.

The configuration of the numerical controller 310 is as described above. The motion of the numerical controller 310 will be described next. FIG. 13 is a flowchart showing the motion of the numerical controller 310.

In step S101, the characteristic shape reading unit 311 reads a machining program (NC data) generated by the CAM device 20, for example, and including characteristic shape information.

In step S102, the characteristic shape reading unit 311 determines whether the machining program includes characteristic shape information. For example, the characteristic shape reading unit 311 determines the presence of characteristic shape information by referring to the process path shown in FIG. 3. If the machining program includes characteristic shape information, the flow goes to step S103. If the machining program does not include characteristic shape information, the flow goes to step S106.

In step S103, the characteristic shape reading unit 311 recognizes the characteristic shape information in the machining program. The characteristic shape information may be information about an edge position on the contour of a workpiece, information about a corner to be smoothened on the contour of a workpiece, information about an edge section in which a tool contacts an edge of a workpiece on a tool path, or information about a smoothing section in which a tool path is a smooth curve, on the tool path, for example. The characteristic shape reading unit 311 determines which one of these information pieces corresponds to the characteristic shape information.

In step S104, the section setting unit 312 sets a constant section on a tool path based on the characteristic shape information recognized by the characteristic shape reading unit 311 in step S103. In step S105, the motion parameter change unit 313 generates parameters, and generates a part to be used for controlling motion in the set section and a part to be used for controlling motion outside the set section. Then, the flow goes to step S102. The generated parameters are parameters in one, or two or more of the following parameter sets (1), (2), and (3), for example:
(1) a command speed, an allowable acceleration, an allowable jerk, and a time constant related to acceleration/deceleration control, for a feed axis;
(2) a command speed, an allowable acceleration, an allowable jerk, and a time constant related to acceleration/deceleration control, for a spindle; and
(3) an error amount allowed between a command path and an actual path. Then, the flow goes to step S102. If the characteristic shape reading unit 311 determines that the machining program does not include characteristic shape information in step S102, the flow goes to step S106.

In step S106, the command output unit 314 outputs a control command based on control data generated by the motion parameter change unit 313 to the servo controller 320.

While the embodiment of the present invention has been described above, the function of the numerical controller 310 can be realized entirely or partially by software. The function of the numerical controller 310 can also be realized by hardware, or by a combination of software and hardware. Being realized by software means being realized by reading and execution of a program by a computer. The numerical controller 310 can be configured by hardware by configuring some or all of the characteristic shape reading unit 311, the section setting unit 312, the motion parameter change unit 313, and the command output unit 314 of the numerical controller 310 using an integrated circuit (IC) such as a large scale integrated circuit (LSI), an application specific integrated circuit (ASIC), a gate array, or a field programmable gate array (FPGA), for example.

To configure the numerical controller 310 by software, a program for numerical control describing motion such as that shown in FIG. 13 for operating a computer functioning as the numerical controller 310 shown in FIG. 2 is stored into the first storage unit 303 such as a hard disk drive or a ROM. The CPU stores information necessary for operation into the second storage unit 304 such as a RAM and performs processing by following the program for numerical control, thereby realizing the motion of the numerical controller 310 according to a program. The program for numerical control can be read from a computer-readable information storage medium storing the program into the first storage unit 303 such as a hard disk. The computer-readable information storage medium includes various types of tangible storage media. The computer-readable information storage medium includes a non-transitory computer-readable information storage medium. Examples of the computer-readable information storage medium include a magnetic storage medium (a flexible disk or a hard disk drive, for example), a magneto-optical storage medium (a magneto-optical disk, for example), a CD read-only memory (CD-ROM), a CD-R, a CD-R/W, and a semiconductor memory (a mask ROM, a programmable ROM (PROM), an erasable PROM (EPROM), a flash ROM, or a random access memory (RAM), for example).

EXPLANATION OF REFERENCE NUMERALS

10 CAD device
20 CAM device
30 CNC machine tool
310 Numerical controller
311 Characteristic shape reading unit
312 Section setting unit
313 Motion parameter change unit
314 Command output unit
320 Servo controller
330 Spindle motor
340 Feed axis motor

What is claimed is:

1. A numerical controller that controls a motor for driving at least one axis based on a machining program including information about a characteristic shape, the numerical controller comprising:
a memory; and
a processor, wherein the processor is configured to:
read information about a characteristic shape to be machined from the machining program including the information about the characteristic shape;
set one or more set sections on a tool path in response to the information about the characteristic shape;
change at least one of a plurality of parameters to be used for controlling the at least one axis outside the set section and inside the set section to generate control data for controlling a motor for driving the at least one axis,
wherein the information about the characteristic shape includes information about a section in which a tool contacts an edge of a workpiece on the tool path,
wherein the parameters include a command speed, an allowable acceleration, an allowable jerk, and a time constant related to acceleration/deceleration control for a feed axis outside the set section and inside the set section,
wherein the set section is a low-speed section having a start point and an end point set such that the low-speed section is larger than the section in which the tool contacts the edge of the workpiece on the tool path, and
wherein the start point of the low-speed section is separated from a start point of the section in which the tool contacts the edge of the workpiece on the tool path by a distance corresponding to the time constant, and the end point of the low-speed section is separated from an end point of the section in which the tool contacts the edge of the workpiece on the tool path by the distance corresponding to the time constant;
compare a commanded feed speed F1 on the tool path with a feed speed F2 appropriate for edge machining; and
describe, if the commanded feed speed F1 is higher than the feed speed F2, a speed command in the control data in such a manner that a feed speed F3 in the low-speed section does not exceed the feed speed F2.

2. The numerical controller according to claim 1, wherein the parameters further include a feed speed of a feed axis and a spindle speed, and the processor changes the spindle speed in synchronization with a change in the feed speed of the feed axis.

3. The numerical controller according to claim 1, wherein the machining program includes information about a geometry of a workpiece or the tool path and information about machining content, the informations being described in a format conforming to a data model having a hierarchical structure.

4. A CNC machine tool comprising the numerical controller according to claim 1.

5. A numerical control method implemented by a numerical controller that controls a motor for driving at least one axis based on a machining program including information about a characteristic shape, the numerical control method comprising:
reading information about a characteristic shape to be machined from the machining program including the information about the characteristic shape;
setting one or more set sections on a tool path in response to the information about the characteristic shape;
changing at least one of a plurality of parameters to be used for controlling the at least one axis outside the set section and inside the set section to generate control data for controlling a motor for driving the at least one axis,
wherein the information about the characteristic shape includes information about a section in which a tool contacts an edge of a workpiece on the tool path,
wherein the parameters include a command speed, an allowable acceleration, an allowable jerk, and a time constant related to acceleration/deceleration control for a feed axis outside the set section and inside the set section,
wherein the set section is a low-speed section having a start point and an end point set such that the low-speed section is larger than the section in which the tool contacts the edge of the workpiece on the tools path, and
wherein the start point of the low-speed section is separated from a start point of the section in which the tool contacts the edge of the workpiece on the tool path by a distance corresponding to the time constant, and the end point of the low-speed section is separated from an end point of the section in which the tool contacts the edge of the workpiece on the tool path by the distance corresponding to the time constant;
comparing a commanded feed speed F1 on the tool path with a feed speed F2 appropriate for edge machining; and
describing, if the commanded feed speed F1 is higher than the feed speed F2, a speed command in the control data in such a manner that a feed speed F3 in the low-speed section does not exceed the feed speed F2.

6. A non-transitory computer-readable information storage medium storing a program for numerical control that causes a computer functioning as a numerical controller that controls a motor for driving at least one axis based on a machining program including information about a characteristic shape to perform:
a process of reading information about a characteristic shape to be machined from the machining program including the information about the characteristic shape;
a process of setting one or more set sections on a tool path in response to the information about the characteristic shape;
a process of changing at least one of a plurality of parameters to be used for controlling the at least one axis both outside the set section and inside the set section to generate control data for controlling a motor for driving the at least one axis,
wherein the information about the characteristic shape includes information about a section in which a tool contacts an edge of a workpiece on the tool path,
wherein the parameters include a command speed, an allowable acceleration, an allowable jerk, and a time constant related to acceleration/deceleration control for a feed axis outside the set section and inside the set section,
wherein the set section is a low-speed section having a start point and an end point set such that the low-speed section is larger than the section in which the tool contacts the edge of the workpiece on the tool path, and
wherein the start point of the low-speed section is separated from a start point of the section in which the tool contacts the edge of the workpiece on the tool path by a distance corresponding to the time constant, and the end point of the low-speed section is separated from an end point of the section in which the tool contacts the edge of the workpiece on the tool path by the distance corresponding to the time constant;

a process of comparing a commanded feed speed F1 on the tool path with a feed speed F2 appropriate for edge machining; and a process of describing, if the commanded feed speed F1 is higher than the feed speed F2, a speed command in the control data in such a manner that a feed speed F3 in the low-speed section does not exceed the feed speed F2.

* * * * *